(12) United States Patent
Clemen

(10) Patent No.: US 8,752,388 B2
(45) Date of Patent: Jun. 17, 2014

(54) GAS-TURBINE PREMIX BURNER

(71) Applicant: Rolls-Royce Deutschland Ltd & Co KG, Blankenfelde-Mahlow (DE)

(72) Inventor: Carsten Clemen, Mittenwalde (DE)

(73) Assignee: Rolls-Royce Deutschland Ltd & Co KG (DE)

( * ) Notice: Subject to any disclaimer, the term of this patent is extended or adjusted under 35 U.S.C. 154(b) by 4 days.

(21) Appl. No.: 13/759,436

(22) Filed: Feb. 5, 2013

(65) Prior Publication Data

US 2013/0205788 A1 Aug. 15, 2013

(30) Foreign Application Priority Data

Feb. 10, 2012 (DE) .......................... 10 2012 002 664

(51) Int. Cl.
*F02C 1/00* (2006.01)
*F02G 3/00* (2006.01)
(52) U.S. Cl.
USPC .............................................. 60/748; 60/737
(58) Field of Classification Search
USPC ................... 60/748, 737, 738, 431, 217, 354; 431/217, 354
See application file for complete search history.

(56) References Cited

U.S. PATENT DOCUMENTS 3,915,387 A * 10/1975 Caruel et al. .................. 239/400
5,218,824 A 6/1993 Cederwall et al.
6,868,676 B1 * 3/2005 Haynes ........................... 60/776
7,913,494 B2 3/2011 Hiromitsu et al.
8,001,786 B2 8/2011 Oda et al.
2002/0162333 A1 11/2002 Zelina
2008/0236165 A1 10/2008 Baudoin et al.
2009/0025394 A1 * 1/2009 Bonzani et al. ................. 60/748
2010/0074757 A1 3/2010 Headland
2011/0314825 A1 * 12/2011 Stryapunin et al. ............. 60/737
2013/0180248 A1 * 7/2013 Parsania et al. ................. 60/737

FOREIGN PATENT DOCUMENTS

DE 69124154 4/1997
GB 710353 6/1954
GB 2327120 1/1999

OTHER PUBLICATIONS

German Search Report dated Oct. 31, 2012 from counterpart application.

* cited by examiner

*Primary Examiner* — Phutthiwat Wongwian
*Assistant Examiner* — William Breazeal
(74) *Attorney, Agent, or Firm* — Timothy J. Klima; Shuttleworth & Ingersoll, PLC

(57) ABSTRACT

The present invention relates to a premix burner of a combustion chamber of a gas turbine with at least one annular duct for supplying air and fuel, including a radially outer and a radially inner combustion chamber wall relative to a burner central axis and with at least one swirler arranged in the duct, said swirler including several flow-guiding elements distributed around the circumference of the duct cross-section, characterized in that at least one radially inner duct wall is provided in the area of the flow-guiding elements with a concave recess of the annular groove type.

9 Claims, 4 Drawing Sheets

GAS-TURBINE PREMIX BURNER

Figure 1:
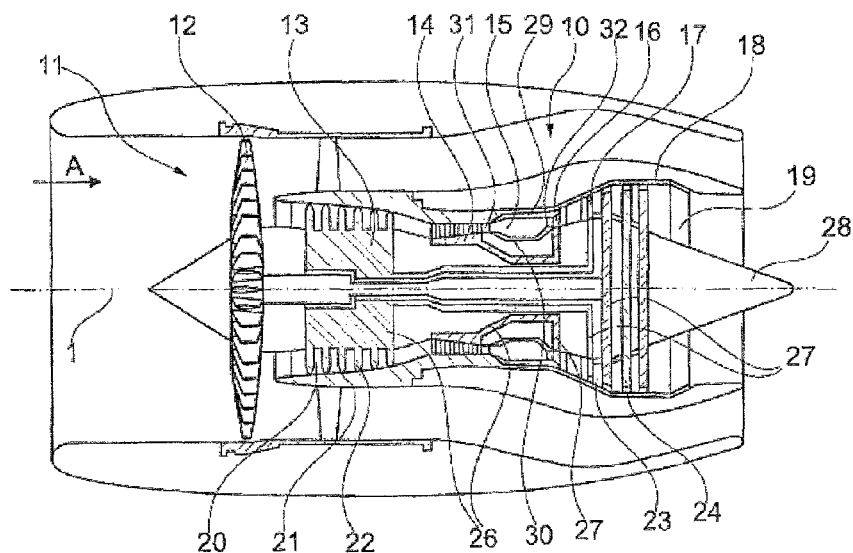

This application claims priority to German Patent Application 102012002664.1 filed Feb. 10, 2012, the entirety of which is incorporated by reference herein.

This invention relates to a gas-turbine premix burner of a stationary gas turbine or an aircraft gas turbine, where the premix burner can be used in both an annular combustion chamber and an individual combustion chamber with only one premix burner.

Premix burners are already known from the state of the art in a wide range of designs. They are used for supplying a combustion chamber with air and fuel. To do so, the premix burner is provided with a fuel nozzle having several annular air ducts arranged concentrically to a burner central axis and into which fuel lines discharge. Swirlers are arranged in the air ducts to impart a swirl to the exiting air/fuel flow and to fluidically optimize the latter such that efficient and low-pollution combustion is possible inside the combustion chamber.

In accordance with the state of the art, the swirlers are provided with a plurality of flow-guiding elements having a profiled design. The drawback here is that the flow-guiding elements do not guide and swirl the airflow in an optimum manner, so that flow obstructions and/or unwelcome flow effects result.

The object underlying the present invention is to provide a premix burner of the type specified at the beginning, which while being simply designed and easily and cost-effectively producible, is characterized by optimized flow conditions, in particular in the area of the flow-guiding elements of a swirler and avoids the disadvantages of the state of the art.

It is a particular object of the present invention to provide solution to the above problems by a combination of the features described herein. Further advantageous embodiments of the present invention become apparent from the present description.

It is thus provided in accordance with the invention that at least one radially inner duct wall in the area of the flow-guiding elements is provided with a concave recess of the annular groove type.

The solution in accordance with the invention thus provides a cross-sectional widening of the flow duct, through which the air is supplied to the combustion chamber. The cross-sectional widening is designed and dimensioned in accordance with the invention such that it compensates for the cross-sectional reduction or change of the duct cross-section caused by the respective profiles of the flow-guiding elements. In accordance with the invention, the airflow passed through the swirler is thus not hindered by the latter. The result of this is optimized or improved flow conditions, leading to an improved and undisturbed supply of air or of an air-fuel mixture to the combustion chamber. As a result, the combustion process itself is optimized.

In accordance with the invention, therefore, the possibility is created of providing a system for configuring the air duct and the flow-guiding elements which permits a systematic layout in terms of a flow angle (swirl distribution) which is as uniform as possible over the height of the air duct. In accordance with the invention, this can be achieved as a function of the respective profile shape of the flow-guiding elements. The result of this is a better mixing of fuel and air as well as a more uniform swirl.

The invention is applicable both to annular combustion chambers and to combustion chambers having only one premix burner.

Figure 5:
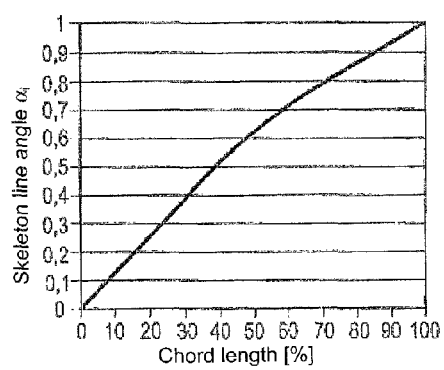
Figure 6:
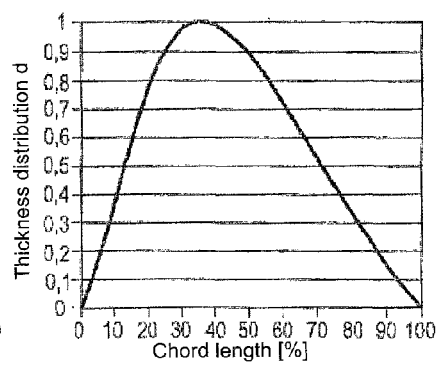
Figure 2:
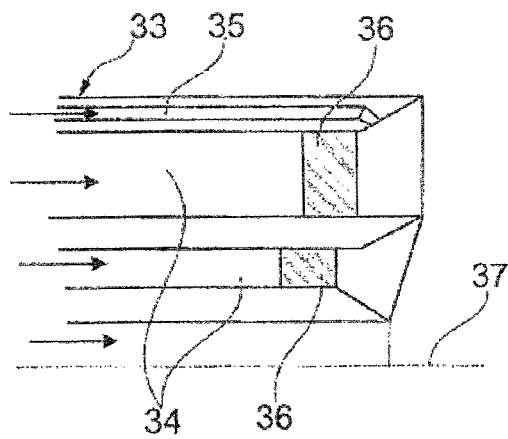
Figure 3:
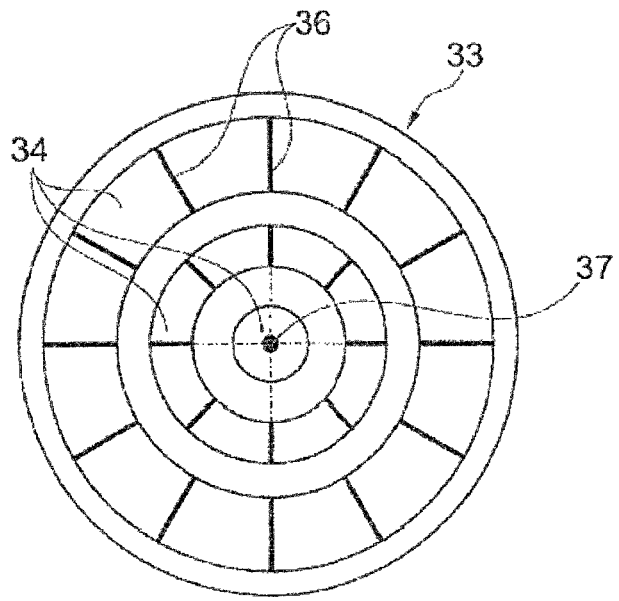
Figure 4:
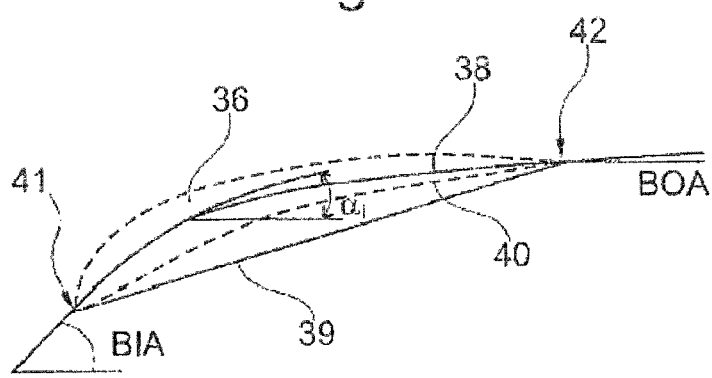
Figure 7:
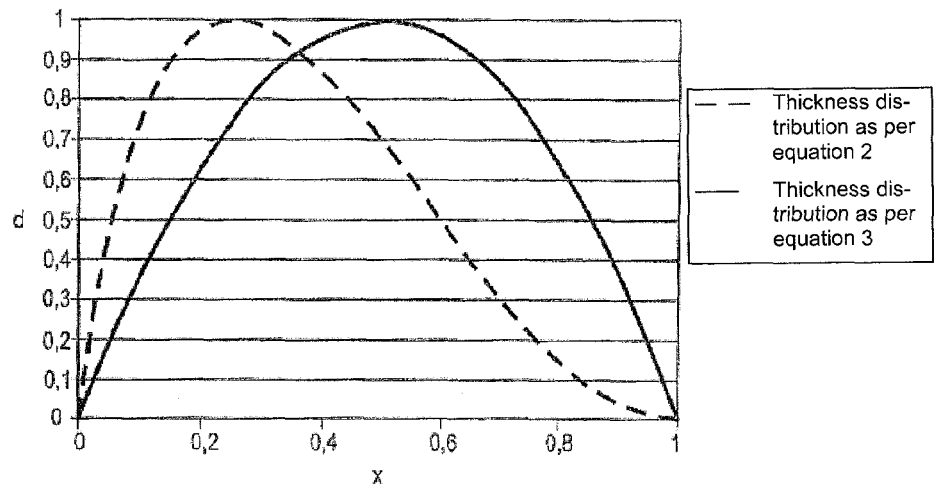
Figure 8:
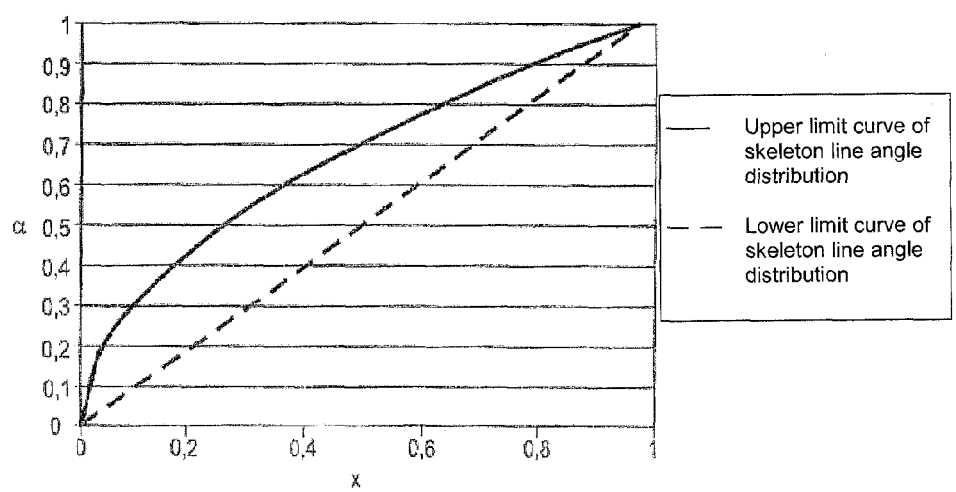
Figure 9:
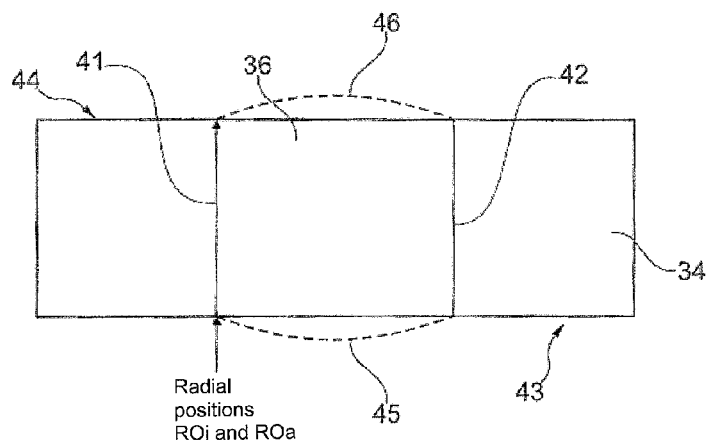
Figure 10:
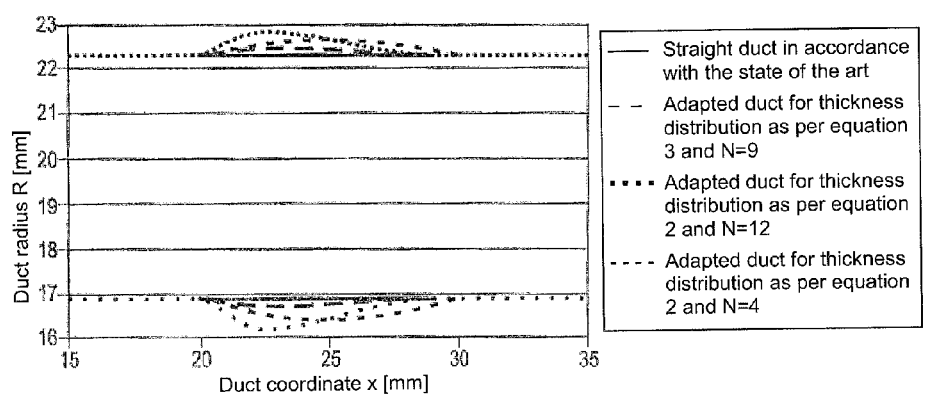

The present invention is described in the following in light of the accompanying drawing showing exemplary embodiments. In the drawing, FIG. 1 shows a schematic representation of a gas-turbine engine in accordance with the present invention, FIG. 2 shows a partial sectional view through a fuel nozzle to be used in accordance with the present invention, FIG. 3 shows a front-side view of the fuel nozzle shown in FIG. 2, FIG. 4 shows a definition of the characteristics of a profile of a flow-guiding element, FIG. 5 shows a graphical representation of the skeleton line angle as a function of the chord length, FIG. 6 shows a schematic representation of the thickness distribution as a function of the chord length, FIG. 7 shows examples of the thickness distributions, resulting from the present invention, of the profiles of the flow-guiding elements, FIG. 8 shows a graphical representation of skeleton line angle distributions, FIG. 9 shows a principal representation in accordance with the present invention of the duct contouring, and FIG. 10 shows a graphical representation of embodiments in accordance with the present invention of the inner and outer duct walls.

The gas-turbine engine 10 in accordance with FIG. 1 is an example where the invention can be used. The engine 10 is of conventional design and includes in the flow direction, one behind the other, an air inlet 11, a fan 12 rotating inside a casing, an intermediate-pressure compressor 13, a high-pressure compressor 14, an annular combustion chamber 15, a high-pressure turbine 16, an intermediate-pressure turbine 17 and a low-pressure turbine 18 as well as an exhaust nozzle 19, all of which being arranged about a central engine axis 1. Reference numeral 28 designates an exhaust cone.

The intermediate-pressure compressor 13 and the high-pressure compressor 14 each include several stages, of which each has an arrangement extending in the circumferential direction of fixed and stationary guide vanes 20, generally referred to as stator vanes and projecting radially inwards from the engine casing 21 in an annular flow duct through the compressors 13, 14. The compressors furthermore have an arrangement of compressor rotor blades 22 which project radially outwards from a rotatable drum or disk 26 linked to hubs 27 of the high-pressure turbine 16 or the intermediate-pressure turbine 17, respectively.

The turbine sections 16, 17, 18 have similar stages, including an arrangement of fixed stator vanes 23 projecting radially inwards from the casing 21 into the annular flow duct through the turbines 16, 17, 18, and a subsequent arrangement of turbine blades 24 projecting outwards from a rotatable hub 27. The compressor drum or compressor disk 26 and the blades 22 arranged thereon, as well as the turbine rotor hub 27 and the turbine rotor blades 24 arranged thereon rotate about the engine axis 1 during operation.

Various combustion chambers, in particular annular combustion chambers 15, with differing geometries and configurations are known from the state of the art. An annular combustion chamber 15 includes an upper/radially outer combustion chamber wall 29 and a lower/radially inner combustion chamber wall 30 that together form an annular duct. Air and fuel are supplied to the annular combustion chamber 15 via the fuel nozzle 33, and air is also supplied through cooling and air intake openings on the side walls. Air and fuel are mixed and combusted inside the fuel nozzle 33 or inside the annular combustion chamber 15. The air and the combustion products are routed through a combustion chamber outlet nozzle 32 in the direction of the turbine 16.

The premix burners or fuel nozzles 33 in annular combustion chambers 15 of stationary gas turbines or aircraft gas turbines are characterized in that the air and the fuel are specifically routed and mixed. FIG. 2 shows in schematic form the burner/fuel nozzle for an annular combustion chamber 15. Air and fuel are passed through several ducts 34, where the air is swirled by means of flow-guiding elements 36 so that air and fuel can mix. The number of air and fuel ducts 34, 35 can be selected as required.

The flow-guiding elements 36 are embedded into the air ducts 34, with the shape of the air duct being cylindrical in accordance with the state of the art and with its height not changing over the length of the flow-guiding element. The flow-guiding element itself is used to impart a swirl to the airflow in the order of 10 to 50 degrees. This is achieved by an aerodynamic shaping obtained by the radial stacking of profile sections of the individual flow-guiding elements. The profile sections are generally identical over the duct height and arranged in linear manner both axially and in the circumferential direction, i.e. without axial or tangential offset.

A profile section of a flow-guiding element 36 can be described as follows: a profile 40 of a flow-guiding element 36 is the superimposition of a skeleton line 38 along a profile chord 39 with a thickness distribution along the profile chord. These definitions are without dimensions to make them universally applicable. The definition of the thickness distribution is characterized here in that it reproduces the thickness along the profile chord 39 as a fraction of the maximum thickness, see FIGS. 5 and 6. The definition of the skeleton line 38 is such that the local angle of the skeleton line 38 is defined in dimensionless form. This is achieved with equation 1, in such a way that the respective value $\alpha$ at a position I along the profile chord 38 connecting the leading edge 41 and the trailing edge 42 of the profile 40 (see FIG. 4) is formed from the actually existing angle of the skeleton line $\alpha_1$ at that point and the inclination of the skeleton line 38 at the leading edge 41 or at the trailing edge 42 relative to the horizontal line (BIA and BOA, see FIG. 4).

$$\alpha(l) = \frac{\alpha_i(l) - BIA}{BOA - BIA} \quad \text{(equation 1)}$$

Within the framework of the invention, the result is two thickness distributions which, combined with a family of skeleton line distributions, respectively result in a profile in accordance with the invention for the flow-guiding element 36 (swirler element).

The two thickness distributions are shown in FIG. 7 and are defined in accordance with equation 2 or equation 3. They are represented along the dimensionless chord length of any profile section. The definition includes here the coordinate x, defined from 0 to 1 along the chord with the dimensionless length 1, where 0 is at the leading edge and 1 at the trailing edge (see FIG. 4).

$$d = 16 \cdot (\sqrt{x} - x)^2 \quad \text{(equation 2)}$$

$$d = 4 \cdot (x - x^2) \quad \text{(equation 3)}$$

The family of skeleton line angle distributions is shown in FIG. 8. Any distribution between the two limit curves is valid here, with the limit curves being defined here by equations 4 (lower) and 5 (upper).

$$\alpha = x \quad \text{(equation 4)}$$

$$\alpha = \sqrt{x} \quad \text{(equation 5)}$$

When combined they result in appropriate profiles. The profiles shown combine the thickness distribution in accordance with equation 2 with the skeleton line angle distribution of the lower or upper limit curve at an inlet angle BIA of 0 degrees and an outlet angle BOA of 45 degrees.

A profile shape of this type is now applied in accordance with the invention to all profile sections along the duct height, and threading can be in the axial and circumferential direction as required. Ideally, the profiling described is combined with an appropriate duct contour.

Depending on the thickness distribution, the duct contour is adjusted in accordance with the invention to the radially inner duct wall 43 and to the radially outer duct wall 44. Hence there is also a corresponding duct shape for each of the two thickness distributions in accordance with the invention.

The solution in accordance with the invention is based on the fact that the flow-guiding elements 36 (swirler elements) constrict the duct cross-section due to their number and their thickness. This constriction is reduced or removed in accordance with the invention by an appropriate duct wall contouring. Since the constriction is determined locally by the thickness distribution curve, the duct contour too, i.e. the shape of the inner and outer wall and the flow-permitting surface resulting from this in combination with profile blocking, must be adjusted. The radial coordinates of the inner and outer duct walls are adjusted to correspond to the thickness distribution along the chord, in such a way that a required area curve is obtained by variation of the duct wall radius along the chord, with the duct walls downstream and at the trailing edge as well as upstream and at the leading edge not being modified.

The duct shape is defined in equation 6 and equation 7. The result is one equation for the radial coordinate of the inner duct wall Ri (equation 6) and one for that of the outer duct wall Ra (equation 7) along the chord length. The parameters needed are the factor N, which can be any number between 1 and the number of flow-guiding elements 36 (swirler elements), the position x, which describes the position along the profile chord and is defined as being between 0 and 1 (leading and trailing edge), the thickness d derived from the thickness distribution at the position x, and the radial coordinate (position) of the inner wall ROi or of the outer wall ROa at the leading edge, see FIG. 9.

$$Ri = 0,5 \cdot N \cdot \frac{d}{\pi} + \sqrt{\left(0,5 \cdot N \cdot \frac{d}{\pi}\right)^2 - \left(\left(\left(\frac{ROi + ROa}{2}\right)^2 - ROi^2\right) - \left(\left(\frac{ROi - ROa}{2}\right)^2 + \frac{ROi + ROa}{2} \cdot N \cdot \frac{d}{\pi}\right)\right)} \quad \text{(equation 6)}$$

$$Ra = 0,5 \cdot N \cdot \frac{d}{\pi} + \sqrt{\left(0,5 \cdot N \cdot \frac{d}{\pi}\right)^2 + \left(\left(ROa^2 - \left(\frac{ROi + ROa}{2}\right)^2\right) + \left(\left(\frac{ROi + ROa}{2}\right)^2 - \frac{ROi + ROa}{2} \cdot N \cdot \frac{d}{\pi}\right)\right)} \quad \text{(equation 7)}$$

FIG. 10 shows exemplary forms for the two thickness distributions according to equations 2 and 3 and for various values for N.

The embodiment in accordance with the invention of the premix burner can be used in both annular combustion chambers and individual combustion chambers. Furthermore, the invention can also be applied to other swirlers in flow ducts.

LIST OF REFERENCE NUMERALS

1 Engine axis
10 Gas-turbine engine
11 Air inlet
12 Fan rotating inside the casing
13 Intermediate-pressure compressor
14 High-pressure compressor
15 Combustion chambers
16 High-pressure turbine
17 Intermediate-pressure turbine
18 Low-pressure turbine
19 Exhaust nozzle
20 Guide vanes
21 Engine casing
22 Compressor rotor blades
23 Stator vanes
24 Turbine blades
26 Compressor drum or disk
27 Turbine rotor hub
28 Exhaust cone
29 Radially outer combustion chamber wall
30 Radially inner combustion chamber wall
31 Combustion chamber head
32 Combustion chamber outlet nozzle
33 Fuel nozzle
34 Air duct
35 Fuel duct
36 Flow-guiding element/swirler element
37 Burner central axis
38 Skeleton line
39 Profile chord
40 Profile
41 Leading edge
42 Trailing edge
43 Radially inner duct wall
44 Radially outer duct wall
45 Concave annular recess (radially inward)
46 Concave annular recess (radially outward)

What is claimed is:

1. A premix burner of a combustion chamber of a gas turbine, comprising:
   at least one annular duct for supplying air and fuel;
   a radially outer and a radially inner combustion chamber wall relative to a burner central axis;
   at least one swirler arranged in the duct, said swirler including a plurality of flow-guiding elements distributed around a circumference of the duct cross-section;
   at least one radially inner duct wall provided in an area of the flow-guiding elements;
   an inner concave recess positioned in the radially inner duct wall and shaped as an annular groove, a concavity of the inner concave recess positioned toward the flow-guiding elements, each flow-guiding element having flow profile that is provided between an inflow-side leading edge and an outflow-side trailing edge, with the inflow-side leading edge and the outflow side trailing edge each being arranged on a cross-sectional plane perpendicular to the burner central axis, a depth of the concavity of the inner concave recess being greater at a first position intermediate the plane of the leading edge to the plane of the trailing edge than at both of the plane of the leading edge and the plane of the trailing edge.

2. The premix burner in accordance with claim 1, and further comprising:
   a radially outer duct wall provided in the area of the flow-guiding elements;
   an outer concave recess positioned in the radially outer duct wall and shaped as an annular groove, a concavity of the outer concave recess positioned toward the flow-guiding elements, a depth of the concavity of the outer concave recess being greater at a second position intermediate the plane of the leading edge to the plane of the trailing edge than at both of the plane of the leading edge and the plane of the trailing edge.

3. The premix burner in accordance with claim 2, wherein a cross-sectional area of at least one chosen from the inner concave recess and the outer concave recess is equal to or less than a total of thicknesses of the flow-guiding elements established in a respective cross-sectional plane perpendicular to the burner axis.

4. The premix burner in accordance with claim 3, wherein at least one chosen from the inner concave recess and the outer concave recess is provided in an axial direction from the plane of the leading edge to the plane of the trailing edge.

5. The premix burner in accordance with claim 2, wherein at least one chosen from the inner concave recess and the outer concave recess is provided in an axial direction from the plane of the leading edge to the plane of the trailing edge.

6. The premix burner in accordance with claim 2, wherein at least one chosen from the inner concave recess and the outer concave recess begins at the plane of the leading edge and extends to and ends at the plane of the trailing edge.

7. The premix burner in accordance with claim 3, wherein at least one chosen from the inner concave recess and the outer concave recess begins at the plane of the leading edge and extends to and ends at the plane of the trailing edge.

8. The premix burner in accordance with claim 2, wherein a shape of the annular duct is defined by at least one chosen from two equations as follows:

$$Ri = 0,5 \cdot N \cdot \frac{d}{\pi} + \sqrt{\left(0,5 \cdot N \cdot \frac{d}{\pi}\right)^2 - \left(\left(\frac{R0i + R0a}{2}\right)^2 - R0i^2\right) - \left(\frac{R0i - R0a}{2}\right)^2 + \frac{R0i + R0a}{2} \cdot N \cdot \frac{d}{\pi}}$$

and $$Ra = 0,5 \cdot N \cdot \frac{d}{\pi} + \sqrt{\left(0,5 \cdot N \cdot \frac{d}{\pi}\right)^2 + \left(R0a^2 - \left(\frac{R0i + R0a}{2}\right)^2\right) + \left(\frac{R0i + R0a}{2}\right)^2 - \frac{R0i + R0a}{2} \cdot N \cdot \frac{d}{\pi}}$$

where:
   Ri is a radial coordinate of the inner duct wall along a chord length of the flow-guiding element;
   Ra is a radial coordinate of the outer duct wall along the chord length;
   a factor N, which is any number between 1 and a number of flow-guiding elements;
   a position x, which describes a position along a profile chord of the flow-guiding element and is defined as being between 0 at the leading edge and 1 at the trailing edge;
   a thickness d derived from a thickness distribution at the position x, where:

$$d = 4 \cdot (x - x^2)$$

ROi is a radial coordinate position of the inner duct wall at the leading edge;
   ROa is a radial coordinate position of the outer duct wall at the leading edge.

9. The premix burner in accordance with claim 1, and further comprising a radially outer duct wall provided in the area of the flow-guiding elements, wherein a shape of the annular duct is defined by at least one chosen from two equations as follows:

$$Ri = 0,5 \cdot N \cdot \frac{d}{\pi} + \sqrt{\left(0,5 \cdot N \cdot \frac{d}{\pi}\right)^2 - \left(\left(\left(\frac{R0i + R0a}{2}\right)^2 - R0i^2\right) - \left(\frac{R0i - R0a}{2}\right)^2 + \frac{R0i + R0a}{2} \cdot N \cdot \frac{d}{\pi}\right)}$$

and $$Ra = 0,5 \cdot N \cdot \frac{d}{\pi} + \sqrt{\left(0,5 \cdot N \cdot \frac{d}{\pi}\right)^2 + \left(\left(R0a^2 - \left(\frac{R0i + R0a}{2}\right)^2\right) + \left(\frac{R0i + R0a}{2}\right)^2 - \frac{R0i + R0a}{2} \cdot N \cdot \frac{d}{\pi}\right)}$$

where:
Ri is a radial coordinate of the inner duct wall along a chord length of the flow-guiding element;
Ra is a radial coordinate of the outer duct wall along the chord length;
a factor N, which is any number between 1 and a number of flow-guiding elements;
a position x, which describes a position along a profile chord of the flow-guiding element and is defined as being between 0 at the leading edge and 1 at the trailing edge;
a thickness d derived from a thickness distribution at the position x, where:

$$d = 4 \cdot (x - x^2)$$

R0i is a radial coordinate position of the inner duct wall at the leading edge;
R0a is a radial coordinate position of the outer duct wall at the leading edge.

* * * * *